United States Patent [19]
Feldhake

[11] 3,713,896
[45] Jan. 30, 1973

[54] SEAL FOR ELECTROCHEMICAL CELLS

[75] Inventor: Ralph H. Feldhake, Verona, Wis.

[73] Assignee: ESB Incorporated

[22] Filed: Aug. 19, 1970

[21] Appl. No.: 65,113

[52] U.S. Cl. ................................. 136/133, 136/169
[51] Int. Cl. ............................................. H01m 1/02
[58] Field of Search ....... 136/133, 135, 166, 169, 111

[56] References Cited

UNITED STATES PATENTS

| | | | |
|---|---|---|---|
| 3,332,802 | 7/1967 | Clune et al. | 136/166 |
| 2,968,686 | 1/1961 | Duddy | 136/166 |
| 2,422,045 | 6/1947 | Ruben | 136/137 |
| 3,068,313 | 12/1962 | Daley | 136/133 |
| 3,440,110 | 4/1969 | Arbter | 136/166 |

*Primary Examiner*—Donald L. Walton
*Attorney*—Thomas A. Lennox, Robert H. Robinson, Raymond L. Balfour and Anthony J. Rossi

[57] ABSTRACT

An insulating seal between metallic battery parts based upon the use of an epoxy-polyamide resin is described. In a first embodiment of the invention, a coating of cured resin on one of the metallic parts forms the seal. In a second embodiment, the seal comprises a coating of epoxy-polyamide resin and a grommet of a selected polymer compressed between the two metal parts. In a third embodiment, a nylon grommet is injection molded over a metallic member having a coating of epoxy-polyamide. In a fourth embodiment, a metallic member having a nickel surface is treated with carbon. The carbonized surface is coated with epoxy-polyamide and a seal is then made according to any of the first three embodiments. In a final series of embodiments, the coatings and other treatments described are applied to both metallic surfaces.

17 Claims, 8 Drawing Figures

INVENTOR.
Ralph H. Feldhake

INVENTOR.
Ralph H. Feldhake

SEAL FOR ELECTROCHEMICAL CELLS

BACKGROUND OF THE INVENTION

1. Field of the Invention

This invention relates to insulating seals between metal parts exposed to strong alkaline solutions. More particularly, it relates to a means for sealing the interface between the metal container and metal cover of electrochemical cells containing an alkaline electrolyte.

2. Description of the Prior Art

It has been found very difficult to form an electrically insulated liquid tight seal between the metallic container and metallic cover of electrochemical cells of the types using an alkaline electrolyte. Typical cell systems where this problem is encountered include mercury-cadmium cells, nickel-cadmium cells, nickel-zinc cells, silver oxide-zinc cells, silver oxide-cadmium cells, mercuric oxide-zinc cells, and alkaline manganese dioxide-zinc cells. Although the problem is accentuated in sealed rechargeable cells, it is also of major importance in the design of primary type batteries. This is particularly true of high quality batteries where the supplier endeavors to produce a high capacity battery capable of delivering its full output after extended storage.

In a typical cell, the active cell parts are assembled in a seamless metal cup. A metal disc forms the cell closure and the cup and disc form the two terminals of the cell. It is necessary to provide an insulating seal between the two metallic parts and for this purpose, a ring or grommet of non-conductive material has been used. This grommet may be shaped to slip over the edge of the metal disc and is clamped to the metal cup by flanging the edge of the cup over the grommet.

The material from which the grommet is made must be inert to the electrolyte contained in the cell and to the cell environment. It must be resilient and flexible and it must be resistant to cold flow under the pressure of the seal even over a long period of time. Materials such as nylon and polypropylene have been found to be some of the most suitable materials for this insulating gasket.

Unfortunately, it transpires that electrolytes, particularly alkaline electrolytes, have a strong tendency to creep on metallic surfaces. This tendency is accentuated when an electrical potential is present. In actual experience, it will be found that creepage is accentuated on a metal part which is in contact with and electrically negative to an alkaline electrolyte. The creepage is harmful in a number of ways. It represents a loss of electrolyte from a cell that at best has a very limited electrolyte supply. The electrolyte that leaks out can be harmful as it is a strong chemical. Also, in the case of alkaline electrolytes, there is a reaction with air to form a white deposit. This deposit detracts from the appearance of the cell and can produce customer resistance.

Numerous designs of seal have been proposed for overcoming the leakage problem. These range from improved mechanical clamping of the gasket to seals based upon ceramic to metal fusion.

One solution has been to coat the metal parts or gasket with an asphaltic compound. The asphalts are actually complex viscous liquids and effect a seal by filling the microscopic surfaces of the metal and gasket. Unfortunately, they slowly flow under the pressure exerted by the gasses contained in the cell which results in eventual leakage. The sticky asphaltic surface is difficult to handle during manufacturing processes. In particular, it tends to pick up dirt and lint from the air and these impurities can interfere with proper sealing.

Common adhesives have been unsatisfactory. For example, epoxy resins applied to metal, while making a perfect and permanent seal with non-polar liquids, are found with alkaline electrolytes to be lifted off of the metallic surface by the greater surface forces of the electrolyte. Also, usual epoxies tend to be brittle. The stresses imposed on epoxy seals during the operations of closing the cell seem to create cracks or other capillary leakage passages so that seals made with the normal epoxies have not been as reliable as seals made with an asphaltic seal coating.

The most successful solution to the problem of sealing small button type sealed cells has been the use of a double top construction. In this design, there are two metallic cover and negative terminal members, one above and in electrical contact with the other. The sealing gasket surrounds the rim of both pieces and extends well into the space between the two covers. Because of this latter feature, the leakage path is considerably longer than it would be with only a single cover member.

This "double top" construction has been further improved by a careful selection of the metals used for the cover members. In particular, it has been found desirable to tin-plate the inside of the inner cover and nickel-plate all the other cover surfaces. It is apparent that this is a complicated construction and is more costly both in material and assembly labor than a single cover seal. It is also apparent that the double top construction takes up useful space in the cell and prevents the user from getting as much battery power as would be expected from the size of the cell.

SUMMARY OF THE INVENTION

In a first embodiment of this invention, a battery cell seal is made in which the seal area of the metal part of the cell which will become the negative terminal is coated with an epoxy resin-polyamide curing agent mixture prior to forming the seal.

In a second embodiment, a molded plastic grommet resistant to cold flow is placed on a metal part previously coated with an epoxy resin-polyamide curing agent mixture.

In a third embodiment, a nylon grommet is injection molded over a portion of the negative terminal which has been coated with an epoxy resin-polyamide curing agent mixture.

In a fourth embodiment, the metal part is carbonized prior to being coated with the resin forming materials.

In a further embodiment, the described coating material is applied to the metal on both sides of the seal.

When a metallic surface is coated with an uncured mixture of epoxy resin mixed with a polyamide curing agent with solvent present, the metallic surface is wetted by the mixture.

This invention is based upon the discovery that when a metallic surface is so coated and after the mixture has been caused to cure, the interface between the metal and the cured resin is much more resistant to the creepage of alkaline electrolyte than any other interface that has been tested.

A second discovery is that when a metal has been coated with an epoxy resin-polyamide curing agent mixture and then has had a nylon part injection molded about it, enough heat can be transferred from the molten nylon to the coating to cure the mixture and at the same time produce a remarkably resistant bond between the metal piece and the surrounding nylon molding.

A third discovery is that the bond between the metal and the cured resin can be further improved if the metal part is first nickel-plated and then treated to place a layer of carbon on the nickel surface. This latter treatment is known as carbonizing.

The polyamide cured epoxy resin of this invention has a firm, slightly deformable consistency. It does not flow as does the asphalt of the older seals described and holds its sealing properties without change. Because it is not brittle, it does not crack or open up under the stresses of closure as do the normal epoxy seals. It is better than the double top construction because it forms a true seal with the underlying metal surface. This contrasts with the double top seal which, although having a long leakage path, has no actual seal other than mechanical pressure. It is also noteworthy that the seal of this invention is less costly and requires less space than the double seal. Other unique and unanticipated benefits of the seal of this invention will be developed in the detailed description which follows later in this specification.

It has been pointed out that with alkaline electrolytes the creepage effect is accentuated by a negative electromotive force. Therefore, it is advantageous that the improved seal as described above is made between the insulating grommet and the negative battery terminal. However, this does not preclude its use on the positive battery terminal as well.

At this time, I do not have a complete explanation for the improved behavior of this seal. From a purely mechanical point of view, the polyamide cured epoxy resin on the surface of the metal conforms very exactly with the surface thereof. Because the coating is somewhat flexible, it adjusts to the stresses to which it is subjected during the molding of the nylon grommet about it and the subsequent clamping of the grommet in the final closing operation without breaking the very perfect fit with the metal. The epoxy-polyamide coating also protects the metallic surface of the seal during the manufacturing operation.

From a physical standpoint, I believe that the following features of the seal of this invention are unique. First, there is a wetting action of the polyamide curing agent on the metal. In this discussion, the term wetting is used to indicate a condition where the adhesive forces between a liquid and a surface are of the same general order of magnitude as the cohesive forces within the liquid itself. When the epoxy resin-amide curing agent cures, and particularly when it is cured by molding nylon around it under pressure, the factors of heat, pressure and presence of solvent in the resin mix tend to further improve the wetting of the metal.

Also, the particular polyamides used in this invention have some of the characteristics of nylons (which are also classed as polyamides). When melted nylon is molded over an uncured epoxy resin-polyamide coating, the nylon and polyamide molecules tend to conform to each other and there is good wetting of the polyamide by the melted nylon with the result that a strong interlocked bond results.

In the case of the carbonized metal surface, where for example, the metal can be nickel-plated steel, a further series of modifying bond interfaces are found. There is an interface between the steel and the nickel plate. During the carbonizing process, carried out at perhaps 925° C., nickel diffuses into the steel forming a nickel steel alloy intimately binding the nickel plating to the steel. In the carbonizing operation, carbon atoms are merged into and tightly bonded to the lattice of the nickel surface.

Carbon thus deposited is known to contain functional groups involving oxygen such as the carboxyl group. It is well known that such groups can form bonds with an active layer of organic material. Thus, it can be stated that the presence of the carbon atoms on the metal surface increases its compatibility with the polyamide-epoxy resin coating, further improving the wetting of the surface by the resin and strengthening the bonding forces across the interface.

The particular resinous solids that show the improved adherence to metal surfaces in the presence of alkaline electrolyte and electrochemical creepage are those made by curing an epoxy resin of the general purpose aromatic type or the aliphatic type with a reacting type curing agent selected from the general family of polyamides, producing cured epoxy resins having some degree of flexibility.

The epoxy resins, which comprise a primary constituent of the herein described compositions, include broadly thermosetting resinous materials, the molecular structure of which is characterized by the presence of reactive epoxy groups serving as polymerization points.

One example of an epoxy resin particularly suitable for the present purposes is the thermosetting resinous condensation product of epichlorohydrin and Bisphenol A, the latter being the reaction product of phenol and acetone, dimethyl di-p-hydroxy-phenyl methane $(CH_3)_2-C-(C_6H_4OH)_2$. Another example is the thermosetting resinous condensation product of epichlorohydrin and Bisphenol F, di-p-hydroxyphenyl methane, $CH_2-(C_6H_4OH)_2$. Still another example is the thermosetting resinous condensation product of epichlorohydrin and glycerol.

More detailed discussions of epoxy resins and in particular the glycidyl ether epoxy resins, may be found in current textbooks, for example "The Encyclopedia of Chemical Technology," Kirk and Othmer (editors), Published by Interscience, New York, 1965, Volume 8, Pages 294 and 295–296.

Epoxy resins of the foregoing class are available from various commercial sources and in varying form, depending in part upon their degree of polymerization. All of them possess the characteristic of condensing when treated with catalytic materials, or more properly, with curing agents of various categories.

Typical epoxies which have been used for the seal of the invention are the general purpose diglycidyl ether types sold as Genepoxy 190 and Genepoxy 451–x75. The 190 and 451 represent a molecular weight index and the x75 indicates that the resin is dissolved in xylene.

Another class of epoxy that is suitable is an epoxy prepared from aliphatic materials.

The use of polyamide type curing agents, for epoxy resins is discussed in the *Handbook of Epoxy Resins*, Lee & Neville, published by McGraw Hill, Chapter 10 (1967). The materials classed as polyamides and including amidopolyamines, imidazoline polyamines and fatty polyamides are curing agents which add a degree of flexibility to the cured resin.

Unfortunately, the polyamides available for commercial use are not prepared as single compounds. Instead, they are sold as prepared and comprise a mixture of several interrelated materials. For this reason, it is not possible to fully identify the materials used in the experimental compounds other than by using the identification given by the suppliers of the materials.

Typical polyamides that are suitable for implementing this invention are the polyamides formed as condensation products of polyamines and the dibasic acids obtained when certain unsaturated fatty acids are polymerized.

These products (Versamids) have molecular weights of up to 10,000 and melting points up to 190° C. Other properties include:

|  | Versamid | | | |
|---|---|---|---|---|
|  | 100 | 115 | 125 | 140 |
| Amine Value | 88 | 216 | 306 | 377 |
| Viscosity (Poises) | | | | |
| at 75° C. | — | 35 | 8 | 8 |
| at 150° C. | 10 | — | — | — |
| Flash Point | | | | |
| (°C, ASTMD 92) | 325 | 205 | 265 | 185 |

A mixture of Versamid 115 and xylene known as Versamid 415 has the following properties:

Versamid 415

| Non-volatile solids (Versamid 115) | 70% |
|---|---|
| Volatile material (xylene) | 30% |
| Viscosity at 40° C. | 6 Poises |
| Flash Point (ASTMD 1310) | 38° C. |

The properties of polyamide cured epoxies have been carefully studied. It is known that the physical properties of the resins are influenced by and can be pre-selected by the proportion of curing agent to epoxy. The greater the proportion of polyamide type curing agent, the greater the flexibility, the softness and the lower the physical properties of the cured resin and vice versa. The properties change in a uniform manner as the proportions of the mix are changed, and likewise, the effect of changing from one polyamide to another is predictable within reasonable limits.

The mixtures of epoxy and polyamide that have been used range from 5¾ parts by weight of polyamide to one part of epoxy to one part polyamide to three parts epoxy. However, best results have been obtained within the range of about 1:1.5 to 1.5:1 parts by weight.

Although the property of flexibility is an important feature of the polyamide curing agent, it is not the sole reason for their use in the seal of this invention. Another feature of this class of curing agent is the chemical similarity between it and nylon. When nylon is injection molded about an uncured polyamide-epoxy coated surface, causing the uncured materials to cure at the time the nylon is solidifying, the materials at the interface tend to blend together providing an excellent seal between the two and one which is far less prone to leakage than when a purely mechanized type joint is used.

Another property of the polyamides is that they have a low surface contact angle on metal surfaces and therefore wet the metal better than, say, epoxy resins with acid curing agents. The wetting property is increased by the presence of a solvent as well as by heat and pressure at the time of curing. Fortunately, these conditions are all present during the injection molding of the nylon ring about the coated metal disc.

For convenience in handling small parts, it is desirable to have the resin coating dry quickly to a comparatively non-tacky condition. To achieve this end, a high molecular weight epoxy resin can be used. In particular, epoxies are available which are solids even though uncured. In order to use these resins at room temperature, they can be dissolved in a solvent. The polyamide curing agents are viscous liquids with or without a solvent for thinning. A coating of polyamide-high molecular weight epoxy resin becomes quite stiff and suitable for handling as soon as the solvent evaporates even though the curing reaction may not have occurred. The cure requires several hours at room temperature. However, on exposure to heat it is more rapid.

DESCRIPTION OF THE PREFERRED EMBODIMENTS

For purposes of clarity, distinctions between uncured and cured resin, the behavior of the two materials and a shortened terminology for the two are listed herewith:

a. The uncured mixture of epoxy resin and polyamide curing agent, hereinafter called "epoxy resin-polyamide curing agent" or simply "the uncured mixture," is a gel having little physical strength. When applied, especially with a solvent carrier, it wets most surfaces to which it is applied.

b. The cured epoxy-polyamide resin, hereinafter called "epoxy-polyamide resin" or "the cured resin," is a visco-elastic solid having physical properties similar to ordinary rubber (Durometer hardness of about 40 to 70). When a surface of the cured resin is brought into pressure contact with another solid surface, the cured resin surface conforms to the imperfection of the other surface but does not "wet" the surface.

The uncured mixture air cures to the cured resin within about 24 hours after application so that in the final state there will be all cured resin and no mixture present in the resin coating.

Although this invention is principally concerned with chemical subject matter, reference to FIGS. 1 to 8 will aid in describing the preferred embodiments of the invention.

Figure 1:
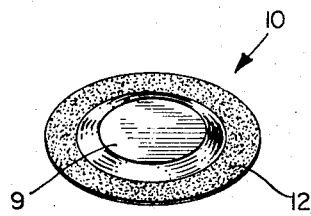
FIG. 1 is a perspective view of an alkaline cell closure and terminal coated in accordance with this invention.

In FIG. 1, a metal cell closure disc and negative cell terminal 10 is shown in perspective. For alkaline cell use, this metal disc can be made of unplated steel, nickel, stainless steel, copper-coated steel or nickel-coated steel. The rim of this disc has been dipped in the uncured mixture to form the coating 12. A central projection 9 is often formed in the closure disc 10 to raise the terminal contact point above the edge of the closure.

Figure 2:
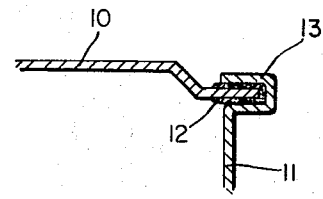
FIG. 2 is an enlarged view of the edge of a seal using the closure of FIG. 1.

In FIG. 2, a cross section of a closure disc 10, having a coating of the uncured mixture 12 is shown. A wall 11 of a metallic container member is shown at 13 compressed around the cured resin coating 12. The coating 12 forms a seal and insulator between the metallic closure disc and the metal can wall 11. This represents the first embodiment of the invention.

Figure 3:
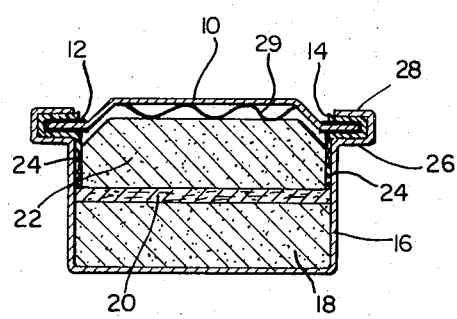
FIG. 3 is a cross section of a cell utilizing the completed seal of this invention.

In the second embodiment, FIG. 3, a metallic container member 16 is shown having a pellet 18 of positive active material deposited therein. Container 16 is in electrical contact with the material 18 and serves as the positive cell terminal. A separator 20 serves to separate the positive material 18 from a pellet of negative active material 22. The latter effectively fills the remainder of the space within the cell. Electrolyte is absorbed by the separator, the positive active material and the negative active material. Pellet 22 is somewhat smaller in diameter than the inside of container 16 and an insulator 24 is provided to prevent contact between pellet 22 and container 16. The cell closure 10 has a coating 12 of the uncured mixture, later cured to the resin, on its rim. A plastic grommet 14 encloses the coated rim of closure 10. The grommet 14 is clamped uniformly and securely between a shoulder 26 formed in the wall of container 16 and a flange 28 also formed in the wall of container 16. The clamping pressure between flange 28 and shoulder 26 on the plastic grommet and the underlying coating of the cured resin completes the sealing means for this closure. The outside diameter of the plastic grommet can also be slightly larger than the diameter of the can wall above the shelf. By this construction, an additional radial pressure can be placed on the seal.

The mixed epoxy resin and polyamide curing agent is placed on the metal closure before the mixed resins have cured. The uncured resins wet the metal. The resin is then cured by heat or by the lapse of time. Because of the nature of the epoxy-polyamide resin and because of its flexibility, the bonds between metal and resin are not broken in the curing process. The result is an extremely tight seal, resistant to both chemical capillary electrochemical forces.

The class of plastic from which grommet 14 is made may be selected from available materials that are resistant to cold flow. Materials which show this property can be found in the polyolefins such as certain high density polyethylenes and polypropylenes as well as materials of the nylon group, polyfluoroethylene compounds, etc.

A spring 29 located between the cell closure 10 and the negative pellet 22 provides an even pressure on the separator 20 as well as providing an electrical path between the negative pellet 22 and the closure 10. Due to the electrical connecting means between pellet 22 and closure 10, closure 10 also serves as the negative terminal of the cell.

It is not necessary that only the rim of the closure disc be coated with the cured resin. The closure disc is normally punched out of a ribbon of metal. For convenience, one or both sides of the ribbon may be coated with the uncured mixture and cured prior to the punching operation. When made in this way, it is obvious that the edge of the closure will not be coated. Therefore, if this form of coating is to be used for an electrically insulated seal, additional insulating means, such as grommet 14 must be included.

Figure 4:
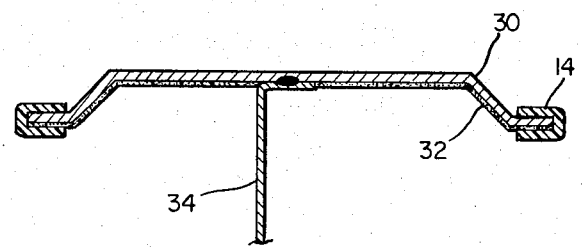
FIG. 4 is a sectional view of a modified form the part shown in FIG. 1.

FIG. 4 shows a disc 30 cut from a coated ribbon, having a coating of the cured resin 32 on its lower surface. Grommet 14 is shown snapped over the edge of the disc. In order to get electrical contact from the cell electrode (not shown) to the disc, conductor 34 is spot welded to disc 30 through the resin layer 32 after the disc has been cut from the coated ribbon.

Figure 5:
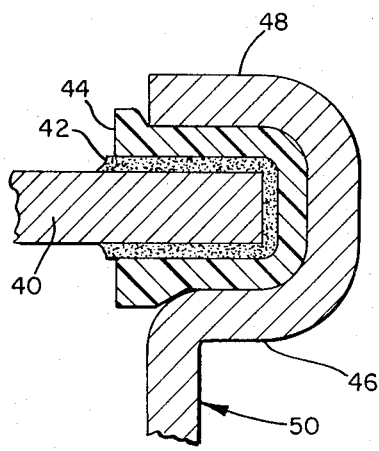
FIG. 5 is an enlarged cross section of a seal embodying a further alternate of the invention.

A third embodiment of the invention is shown in enlarged sectional detail in FIG. 5. In this modification, a stainless steel disc 40, for example, is coated on its rim with a coating of the uncured mixture 42. A nylon grommet 44 is shown injection molded around the rim of disc 40 and coating 42. In performing the injection molding operation, the disc is placed in a mold having a cavity of the size and shape of the desired nylon grommet. Nylon, make liquid by heat, is forced at high pressure into the mold cavity and allowed to cool. The finished part is then removed from the mold. This method of molding nylon is old in the art and is the normal method for fabricating nylon and other thermoplastic materials. The heat of the molding operation is sufficient to cure the uncured mixture to the cured resin. To complete the seal, grommet 44 is shown firmly clamped between shoulder 46 and flange 48 formed in the metallic container member wall 50.

Figure 6:
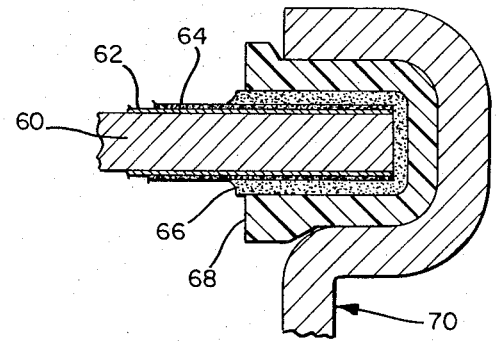
FIG. 6 is a section of still another embodiment of the battery seal.

In a fourth embodiment, shown in FIG. 6, disc 60 of steel forms the negative terminal of an alkaline cell and has a nickel coating 62. A coating of carbon 64 has been placed on the nickel by the carbonizing process around the rim of the disc 60. The carbonizing process, originally developed to improve the heat dissipation of vacuum tube parts, can be carried out as follows:

A sheet of nickel or nickel-plated steel is heated in air to about 925° C. forming a layer of green nickel oxide thereon. It is then immediately placed in an atmosphere of hydrocarbon gas, e.g. at the same temperature. The hydrocarbon gas decomposes to give carbon and hydrogen. The hydrogen reacts with the nickel oxide, reducing it to nickel and the carbon is deposited on and becomes bonded to the metal surface giving it a uniform black appearance. (A more complete description of this operation can be found in Metals and Alloys, Nov. 1938, pages 303–306.)

A dip coating of the uncured mixture is shown on the carbon coating at 66. A nylon grommet 68 is injection molded on the uncured mixture 66 curing it to the cured resin. To complete the seal, the nylon grommet is securely clamped by metal cell container 70.

It is to be particularly noted that the purpose of the compression in the seals of FIGS. 3, 5 and 6 is to effect a seal at the mechanical interface of the grommet and the metallic container member. The interface between the metallic closure member and the cured resin is of such a nature that it is completely tight with or without additional compression.

Although the final nylon to steel (positive) interface does not present the creepage problem found with the steel (negative) to nylon interface, it still may be desirable to apply the uncured mixture, with or without the carbonized layer, to the positive container in the area used to seal the cell. When using such a double seal, it must be pointed out that if the seal is to be used for final closure of a device, at least one mechanical interface must be provided to permit assembly, and this is preferably the interface with the positive container. Also, where there is a mechanical interface, compression must be applied to effect a seal.

Figure 7:
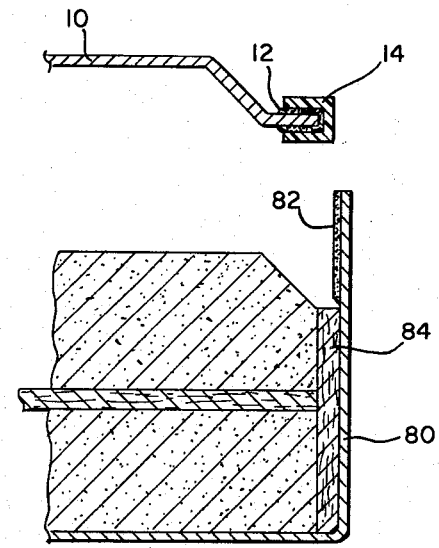
FIG. 7 is partial cross section of a partially assembled cell employing a further embodiment of the invention.

In FIG. 7, a double seal based upon the second embodiment of the invention is depicted, prior to the final closing operation. The cell closure 10 with coating 12 and plastic grommet 14 is shown positioned above the cell opening of the metallic container member indicated by 80. The inside of the lip of container 80 is coated with the cured resin coating 82. A rest 84 is provided to support closure 10 against the clamping pressure set up when lip of container 80 is flanged over the upper surface of nylon grommet 14.

Figure 8:
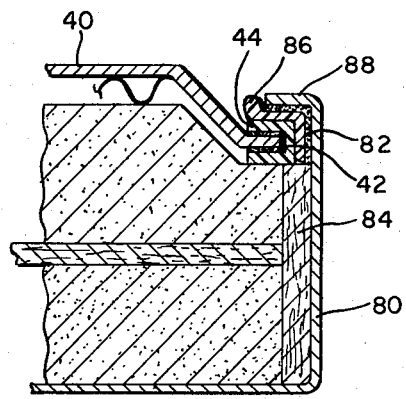
FIG. 8 is a partial cross section of a completed cell making use of still another embodiment of the invention.

A double seal based upon the third embodiment of the invention is shown in FIG. 8. In this figure, 40 represents the metallic closure member having a coating of the uncured mixture 42 on its lip. A nylon grommet 44 is injection molded around the lip of closure 40 curing the mixture. The lip of container wall 80 is coated with the uncured mixture as shown at 82. A nylon ring 86 is then injection molded onto the treated surface 82 of container 80 curing the mixture. The seal is shown completed with the lip flanged over at 88 and with rest 84 provided to take the pressure of the flange. Radial pressure may also be imposed on the seal by a sizing operation. The only mechanical interface is that between nylon piece 44 and nylon piece 86.

A double seal based upon the fourth embodiment will be similar to FIG. 8 except that layers of nickel and carbon will underlie the resin coatings on metal parts 10 and 80.

From the above, it can be seen that four classes of graded seal, each based on the use of an epoxy resin-polyamide coating are embodied in the invention.

In the first, the seal is built upon:

a. a wetted interface between metal (negative) and the uncured mixture, the mixture subsequently cured to the resin; and b. a mechanical interface between the cured resin and metal (positive).

In the second, the seal is built upon:

a. a wetted interface between metal (negative) and the cured resin;

b. a mechanical interface between the cured resin and a plastic grommet; and c. a mechanical interface between the plastic grommet and metal (positive) with all interfaces restrained by mechanical pressure.

In the third, a nylon part is injection molded upon a coating of the mixture on the metal base. This seal comprises:

a. a wetted interface between metal (negative) and the cured resin;

b. a wetted interface between the cured resin and nylon having some degree of chemical linkage; and c. a mechanical interface between nylon and metal (positive) with all interfaces restrained by mechanical pressure.

In the fourth class, making use of the carbonized surface, the several interfaces described are:

a. a molecular bonding between steel (negative) and nickel produced by heat treatment after plating;

b. an intermediate type of bond between nickel and carbon;

c. a wetted intermediate bond between the carbon and Cured Resin;

d. a wetted bond between the cured resin and the nylon grommet molded in situ; and e. a mechanical interface between the nylon and steel or plated steel (positive) with all interfaces restrained by mechanical pressure.

A double seal of the second embodiment described above includes:

a. a wetted metal (negative) to cured resin interface;

b. a mechanical interface between cured resin and nylon grommet;

c. a mechanical interface between nylon and cured resin; and d. a wetted interface between cured resin and metal (positive).

Some typical examples of the application and utility of this invention include:

EXAMPLE I

Mixes were prepared as follows:

Mix No. 1
| Polyamide | (Versamid 415) | 5.75 pts. by wt. |
| Epoxy | (Genepoxy 190) | 1 pts. by wt. |
| Xylene | | 15 pts. by wt. |

Mix No. 2
| Polyamide | (Versamid 415) | 1.4 pts. by wt. |
| Epoxy | (Genepoxy 451×75) | 1 pts. by wt. |
| Xylene | | 3.75 pts. by wt. |

Closures were brush coated with mix 1 and mix 2 as described above in Example I and cured at 100° C. for 1 hour. Then they were assembled into hearing aid cells similar to FIG. 3 forming seals of the second embodiment. Nylon grommets (Zytel 101 and Belding 1107) were snapped over the closure rims and the cells were completed. The cells were then placed in an oven at 145° and 50 percent humidity for 4 weeks. After this test, they were examined as follows:

| Mix | Grommet | No. cells | No. No leak | slight | Medium | heavy |
|---|---|---|---|---|---|---|
| 1 | Zytel 101 | 11 | 7 | 1 | 0 | 3 |
| 1 | Belding 1107 | 9 | 9 | 0 | 0 | 0 |
| 2 | Zytel 101 | 11 | 8 | 3 | 0 | 0 |
| 2 | Belding 1107 | 11 | 6 | 5 | 0 | 0 |

EXAMPLE II

Cell 1: premolded nylon grommet, steel not coated
Cell 2: premolded nylon grommet, steel coated with mix 1, Example I, cell design similar to FIG. 3
Percent loss of electrolyte after 24 hot-cold cycles

| | |
|---|---|
| Cell 1 | 8.6% loss |
| Cell 2 | 0.8% loss |

EXAMPLE III

Cell type A: polyethylene grommet injection molded on double steel cover. (a present standard construction)
Cell type B: single steel closure coated with mix 2, Example I, and nylon grommet injection molded thereon to form a seal of the third embodiment. (see FIG. 5)

Test:
24 weeks storage at 113° F. and 50% R. H.
50 cells type A—leakers 50
50 cells type B—leakers 0

These examples serve to show the greatly improved properties of seals made in accordance with this invention and the improvement of the invention over the best seals previously available.

Having fully described my invention, given illustrations of its application, and examples of its use, I claim;

1. An electrochemical cell comprising:
   a. a positive electrode, a negative electrode, a separator therebetween and an aqueous electrolyte;
   b. a metallic container member partially enclosing the electrodes and electrically connected to a first electrode;
   c. a metallic closure member completing the enclosing of the electrodes and electrically connected to a second electrode of opposite polarity from said first electrode; and
   d. a layer of cured epoxy-polyamide resin located and compressed between the metallic container member and the metallic closure member in wetting contact with one of the metallic members and in non-wetting contact with the other metallic member, whereby a fluid-tight electrically insulating seal between the metallic container and the metallic closure is effected.

2. A cell as described in claim 1 in which the metallic member in wetting contact with the resin is electrically connected to the negative electrode.

3. An electrochemical cell comprising:
   a. a positive electrode, a negative electrode, a separator therebetween and an aqueous electrolyte;
   b. a first metallic container member electrically connected to a first electrode and a second metallic closure member electrically connected to a second electrode of opposite polarity from said first electrode;
   c. a coating of cured epoxy-polyamide resin upon and in wetting contact with the first metallic member; and
   d. a plastic member resistant to cold flow located and compressed between the coating of resin on the first metallic member and the second metallic member whereby a fluid-tight electrically insulating seal between the first metallic member and the second metallic member is effected.

4. A cell as described in claim 3 in which the plastic member resistant to cold flow is chosen from the group which consists of nylon, polypropylene, high density polyethylene and polyfluoroethylene.

5. A cell as described in claim 3 in which the first metallic member is connected to the negative electrode.

6. A cell as described in claim 5 in which the first metallic member has a coating of carbon overlying a nickel surface and underlying and wetted by the resin.

7. An electrochemical cell comprising:
   a. a positive electrode, a negative electrode, a separator therebetween and an aqueous electrolyte;
   b. a first metallic container member electrically connected to a first electrode and a second metallic closure member electrically connected to a second electrode of opposite polarity from said first electrode;
   c. a coating of cured epoxy-polyamide resin upon and in wetting contact with the first metallic member; and
   d. a nylon plastic member located and compressed between the coating of resin on the first metallic member and the second metallic member and in wetting contact with the coating of resin whereby a fluid-tight electrically insulating seal between the first metallic member and the second metallic member is effected.

8. A cell as defined in claim 7 in which the first metallic member is connected to the negative electrode.

9. A cell as defined in claim 8 in which the metallic member connected to the negative electrode has a coating of carbon overlying a nickel surface and underlying and wetted by the resin.

10. An electrochemical cell comprising:
    a. a positive electrode, a negative electrode, a separator therebetween and an aqueous electrolyte;
    b. a first metallic container member electrically connected to a first electrode and a second metallic closure member electrically connected to a second electrode of opposite polarity from said first electrode;
    c. a coating of cured epoxy-polyamide resin upon and in wetting contact with the first metallic member;
    d. a coating of cured epoxy-polyamide resin upon and in wetting contact with the second metallic member; and
    e. the resin coating on the first metallic part and the resin coating on the second metallic part being in compressive contact with each other whereby a fluid-tight electrically insulating seal between the metallic container and the metallic closure is effected.

11. A cell as defined in claim 10 in which at least one metallic member has a coating of carbon overlying a nickel surface and underlying and wetted by the resin.

12. An electrochemical cell comprising:
    a. a positive electrode, a negative electrode, a separator therebetween and an aqueous electrolyte;

b. a first metallic container member electrically connected to a first electrode and a second metallic closure member electrically connected to a second electrode of opposite polarity from said first electrode;

c. a coating of cured epoxy-polyamide resin upon and in wetting contact with the first metallic member;

d. a coating of cured epoxy-polyamide resin upon and in wetting contact with the second metallic member; and e. a plastic member resistant to cold flow located and compressed between the coating on the first metallic member and the coating on the second metallic member whereby a fluid-tight electrically insulating seal between the first metallic member and the second metallic member is effected.

13. A cell as defined in claim 12 in which the plastic member is chosen from the group which consists of nylon, polypropylene, high density polyethylene and polyfluoroethylene.

14. A cell as defined in claim 12 in which at least one metallic member has a coating of carbon overlying a nickel surface and underlying and wetted by the resin.

15. An electrochemical cell comprising:

a. a first electrode, a second electrode, separator means therebetween and an aqueous electrolyte, one of the electrodes being a positive electrode and the other electrode being a negative electrode;

b. a metallic container member partially enclosing the electrodes and electrically connected to the first electrode;

c. a metallic closure member in electrical contact with the second electrode;

d. a layer of cured epoxy-polyamide resin located between the metallic container member and the metallic closure member and completing the enclosure of the electrodes, the separator means and the electrolyte, the resin layer being in wetting contact with one of the metallic members and in non-wetting contact with the other; and e. the metallic member wet by the layer of resin having a coating of carbonized nickel underlying the layer of resin.

16. An electrochemical cell as defined in claim 15 in which the metallic member having the coating of carbonized nickel underlying and wet by the layer of resin is electrically connected to the negative electrode.

17. An electrochemical cell as defined in claim 16, in which the metallic member electrically connected to the negative electrode is the closure member.

* * * * *